(12) United States Patent
Yoshikawa et al.

(10) Patent No.: US 10,408,104 B2
(45) Date of Patent: Sep. 10, 2019

(54) CATALYST APPARATUS FOR INTERNAL COMBUSTION ENGINE

(71) Applicant: NGK Spark Plug Co., LTD., Nagoya (JP)

(72) Inventors: Takaya Yoshikawa, Kasugai (JP); Takaaki Yamada, Iwakura (JP); Yuki Saito, Inuyama (JP)

(73) Assignee: NGK Spark Plug Co., LTD., Nagoya (JP)

( * ) Notice: Subject to any disclaimer, the term of this patent is extended or adjusted under 35 U.S.C. 154(b) by 0 days.

(21) Appl. No.: 15/945,357

(22) Filed: Apr. 4, 2018

(65) Prior Publication Data

US 2018/0291788 A1    Oct. 11, 2018

(30) Foreign Application Priority Data

Apr. 5, 2017  (JP) .................................. 2017-074930

(51) Int. Cl.
 *F01N 3/20* (2006.01)
 *F01N 3/28* (2006.01)
 *F01N 13/00* (2010.01)

(52) U.S. Cl.
 CPC ......... *F01N 3/2026* (2013.01); *F01N 3/2013* (2013.01); *F01N 3/281* (2013.01); *F01N 13/0097* (2014.06); *F01N 2240/16* (2013.01); *F01N 2330/02* (2013.01); *F01N 2330/42* (2013.01)

(58) Field of Classification Search
 CPC ............... F01N 3/2026; F01N 2240/16; F01N 2330/02; F01N 3/2013; F01N 3/281

USPC ........................................ 422/174, 177, 180
See application file for complete search history.

(56) References Cited

U.S. PATENT DOCUMENTS

| | | | | |
|---|---|---|---|---|
| 4,928,485 A | * | 5/1990 | Whittenberger | F01N 3/2026 422/180 |
| 4,976,929 A | * | 12/1990 | Cornelison | B01D 53/9454 422/174 |
| 5,140,812 A | * | 8/1992 | Cornelison | F01N 3/2026 392/375 |
| 5,259,100 A | * | 11/1993 | Takahashi | B21D 28/12 29/33 J |
| 5,384,099 A | * | 1/1995 | Sheller | B01J 35/04 422/174 |

(Continued)

FOREIGN PATENT DOCUMENTS

| | | |
|---|---|---|
| JP | 09-310611 A | 12/1997 |
| JP | 2008-014239 A | 1/2008 |

*Primary Examiner* — Tom P Duong
(74) *Attorney, Agent, or Firm* — Leason Ellis LLP

(57) ABSTRACT

A catalyst apparatus is disposed in an exhaust passage for exhaust gas discharged from an internal combustion engine and includes a catalyst section for purifying the exhaust gas, and a heater section disposed upstream of the catalyst section in the exhaust passage and adapted to heat the exhaust gas. The heater section is configured such that a plurality of metal thin plates and insulators are stacked alternatingly are wound. The heater section contains a pair comprising a positive electrode and a negative electrode for energizing and heating the metal thin plates. The positive and negative electrodes are joined to each of the metal thin plates in such a manner that the positive electrode is located away from the negative electrode in a winding direction of the metal thin plates.

9 Claims, 4 Drawing Sheets

(56) References Cited

U.S. PATENT DOCUMENTS

| | | | | |
|---|---|---|---|---|
| 5,411,711 A | * | 5/1995 | Swars | B01J 35/0033 422/177 |
| 5,562,885 A | * | 10/1996 | Bayer | B01J 35/0033 422/174 |
| 5,582,805 A | * | 12/1996 | Yoshizaki | F01N 3/2026 422/174 |
| 5,584,175 A | * | 12/1996 | Carlborg | B01J 35/0033 422/174 |
| 5,628,928 A | * | 5/1997 | Rolf | B01J 35/0033 219/476 |
| 5,852,274 A | * | 12/1998 | Watanabe | B01D 53/9454 219/117.1 |
| 6,184,506 B1 | * | 2/2001 | Shoji | B01D 53/885 219/537 |

* cited by examiner

US 10,408,104 B2

CATALYST APPARATUS FOR INTERNAL COMBUSTION ENGINE

This application claims the benefit of Japanese Patent Application No. 2017-074930 filed Apr. 5, 2017, which is incorporated herein by reference in its entirety.

FIELD OF THE INVENTION

The present invention relates to a catalyst apparatus for an internal combustion engine.

BACKGROUND OF THE INVENTION

A conventionally known structure disposed in an exhaust passage of an internal combustion engine has a catalyst-carrying filter for capturing particulates contained in exhaust gas so as to burn the particulates, and a heater disposed upstream of the catalyst-carrying filter and adapted to activate the catalyst (see Japanese Unexamined Publication No. H09-310611). The heater is a honeycomb-type heating element formed by spirally winding a metal foil and a corrugated plate superposed on each other about a center electrode and generates heat through application of electricity to the center electrode and a counter electrode provided on the outer-circumference side of the heater.

According to a developed technique (see Japanese Unexamined Publication No. 20089-14239), a plurality of positive electrodes and a plurality of negative electrodes are provided on a metal foil at different positions, and by selecting any one positive electrode and any one negative electrode, only a partial region of the metal foil generates heat so as to produce a catalytic function on the metal foil.

Problem to be Solved by the Invention

Incidentally, the above-mentioned electrodes are joined to the metal foil of the heater by welding or the like; accordingly, vibration or the like of a vehicle may cause breaking of a weld, or breaking of a lead wire connected to the metal foil or an electrode. In the event of such an incident, since the conventional heater uses a single metal foil as a heating element, the heater fails to generate heat.

Also, according to the technique described in Japanese Unexamined Publication No. 20089-14239, only a partial region of the metal foil generates heat; therefore, in the event of breaking of a wire, even though another electrode is selected, the original heating capability of one metal foil of the heater cannot be exhibited.

Thus, an object of the present invention is to provide a catalyst apparatus for an internal combustion engine capable of preventing the occurrence of a failure to energize the entire heater section so that the heater section can reliably generate heat.

SUMMARY OF THE INVENTION

Means for Solving the Problem

In order to solve the above problem, a catalyst apparatus for an internal combustion engine of the present invention is disposed in an exhaust passage for exhaust gas discharged from an internal combustion engine and comprises a catalyst section in which the exhaust gas is purified, and a heater section in which the exhaust gas is heated, said heater section being disposed upstream of the catalyst section in the exhaust passage. The heater section contains a plurality of metal thin plates and insulators that are stacked alternatingly and are wound. The heater section contains a pair comprising a positive electrode and a negative electrode for energizing and heating the metal thin plate. The positive and negative electrodes are joined to each of the metal thin plates in such a manner that the positive electrode is located away from the negative electrode in a winding direction of the metal thin plates.

According to the present catalyst apparatus for an internal combustion engine, the heater section has a plurality of conductors (metal thin plates) to be individually energized. Thus, even when a joint portion of an electrode joined to a metal thin plate is broken or a lead wire connected to the metal foil or the electrode is broken and energization of that metal thin plate becomes impossible, the other conductors are normally energized to thereby generate heat. Therefore, a failure to energize the entire heater section is prevented, whereby the heater section can reliably generate heat.

Also, since a plurality of conductors are wound, the axial length of the heater section does not increase; thus, the heater section becomes compact.

In the catalyst apparatus for an internal combustion engine of the present invention, the positive electrode and the negative electrode may be joined to each of the metal thin plates at a position located inward of longitudinally opposite ends of the metal thin plates.

According to the present catalyst apparatus for an internal combustion engine, margins of the metal thin plates located outward of the positive electrodes and the negative electrodes are not energized and thus do not generate heat, to thereby function as heat sinks for cooling the positive electrodes and the negative electrodes. Accordingly, deterioration in strength of joints between the metal thin plates and the positive and negative electrodes can be restrained, so that a failure to energize the heater section as a result of breaking of the joints can be restrained.

In the catalyst apparatus for an internal combustion engine of the present invention, the heater section contains a plurality of the pairs, either of a group of the positive electrodes and a group of the negative electrodes may be disposed only at an outer circumferential portion of the heater section, whereas the other group may be disposed only at a central portion of the heater section; and the positive electrodes may be disposed at respectively different positions along a circumferential direction of the heater section, and the negative electrodes may be disposed at respectively different positions along the circumferential direction of the heater section.

The present catalyst apparatus for an internal combustion engine can restrain overheating of a certain region which could otherwise result from concentration of the positive electrodes or the negative electrodes at the region; accordingly, deterioration in strength of joints between the metal thin plates and the positive and negative electrodes can be restrained, so that a failure to energize the heater section as a result of breaking of the joints can be restrained. Notably, since a group of the positive electrodes and a group of the negative electrodes are disposed separately at an outer circumferential portion and at a central portion of the heater section, all of the positive electrodes and the negative electrodes are not necessarily disposed at respectively different positions.

In the catalyst apparatus for an internal combustion engine of the present invention, all of the positive electrodes and the negative electrodes may be disposed at respectively different positions along a circumferential direction of the heater section.

The present catalyst apparatus for an internal combustion engine can restrain overheating of a certain region which could otherwise result from concentration of the positive electrodes or the negative electrodes in the region; accordingly, deterioration in strength of joints between the metal thin plates and the positive and negative electrodes can be restrained, so that a failure to energize the heater section as a result of breaking of the joints can be restrained. Particularly, in the case of a heater section having a small diameter, even though a group of the positive electrodes and a group of the negative electrodes are disposed separately at an outer circumferential portion and at a central portion of the heater section, since the positive electrodes and the negative electrodes may possibly be disposed close to one another, disposition of all of the positive electrodes and the negative electrodes at respectively different positions is effective.

In the catalyst apparatus for an internal combustion engine of the present invention, areas of portions of the metal thin plates, each of which portion is located between the positive electrode and the negative electrode, may vary from each other within a range of ±10%.

According to the present catalyst apparatus for an internal combustion engine, the metal thin plates have substantially the same heat generation capability with a tolerance of ±10%; accordingly, even in the event of a failure to energize any one of the metal thin plates, since the other metal thin plates exhibit substantially the same heat generation capability as that of the metal thin plate in a compensating manner, the heater section 4 can maintain its heat generation capability.

Effect of the Invention

According to the present invention, in a catalyst apparatus for an internal combustion engine, the occurrence of a failure to energize the entire heater section can be prevented, whereby a heater section can reliably generate heat.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

An embodiment of the present invention will next be described with reference to the drawings.

Figure 1:
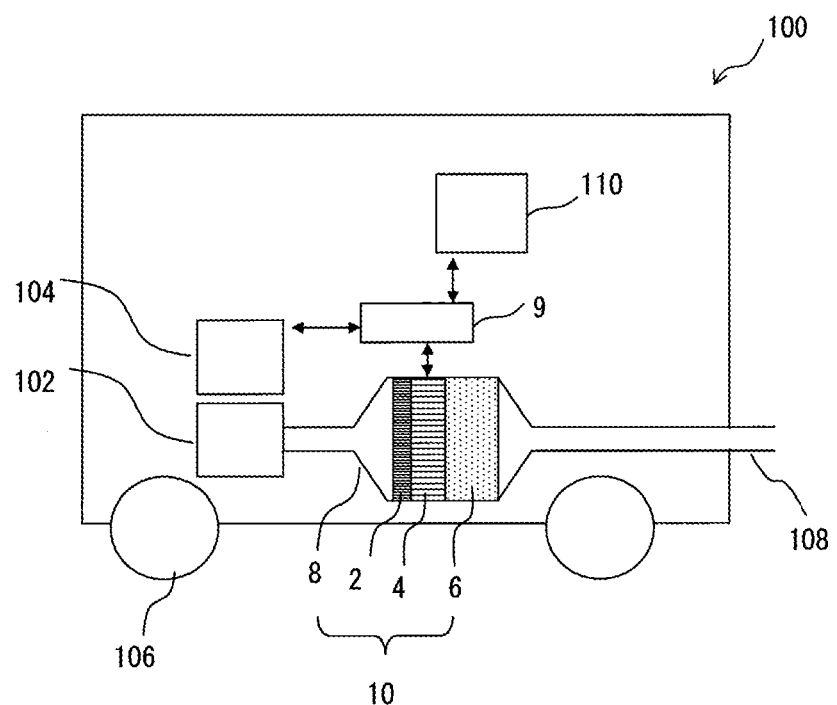
FIG. 1 is a schematic view showing the configuration of a catalyst apparatus for an internal combustion engine according to an embodiment of the present invention.
Figure 2:
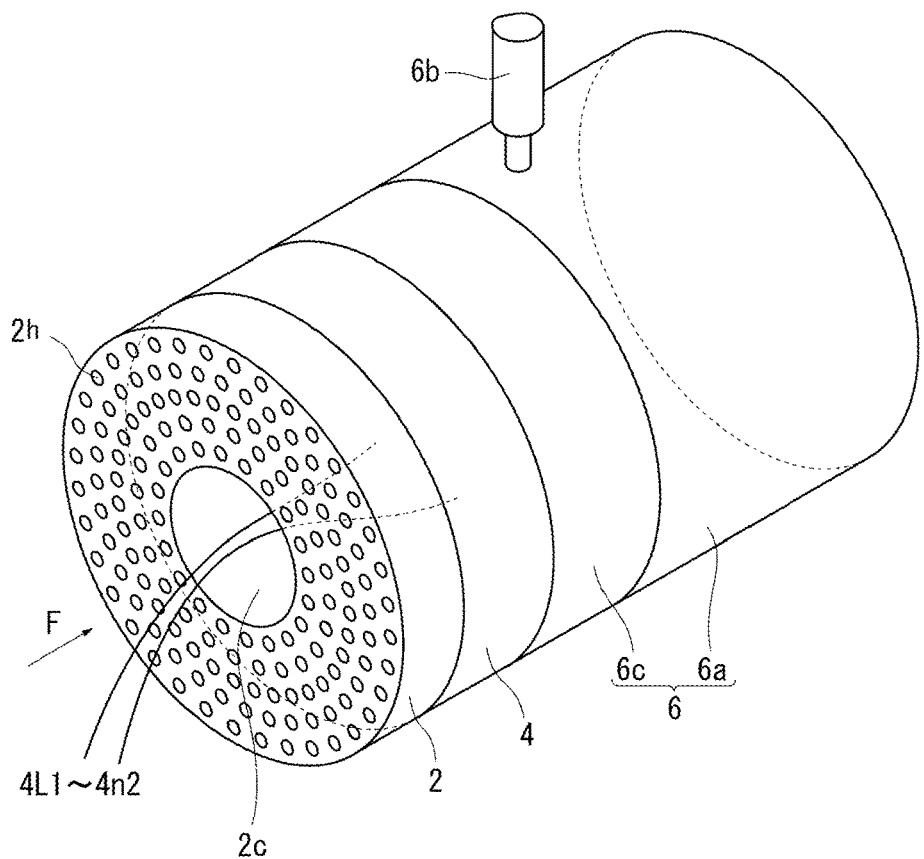
FIG. 2 is a perspective view showing constituent elements of the catalyst apparatus.

FIG. 1 is a schematic view showing the configuration of a catalyst apparatus 10 for an internal combustion engine according to an embodiment of the present invention, and FIG. 2 is a perspective view showing constituent elements of the catalyst apparatus.

As shown in FIG. 1, a vehicle 100 is a hybrid vehicle including an internal combustion engine (e.g., a diesel engine) 102 and a motor 104. The internal combustion engine 102 and the motor 104 drive tires 106.

The catalyst apparatus 10 is disposed in an exhaust passage 108 for exhaust gas discharged from the internal combustion engine 102. The catalyst apparatus 10 has a canning structure in which a catalyst section 6, a heater section 4 disposed upstream of the catalyst section 6, and a retainer 2 disposed upstream of the heater section 4 are press-fitted in a casing 9. The catalyst apparatus 10 has a control unit 9 (microcomputer) for controlling energization of the heater section 4, and the control unit 9 is connected to a vehicle-side ECU 110.

The catalyst section 6 purifies exhaust gas and has an SCR catalyst in the present embodiment. The catalyst section 6 also has a urea water injector 6b and a DPF (Diesel Particulate Filter) 6c disposed upstream of the SCR catalyst 6a as shown in FIG. 2.

Figure 3:
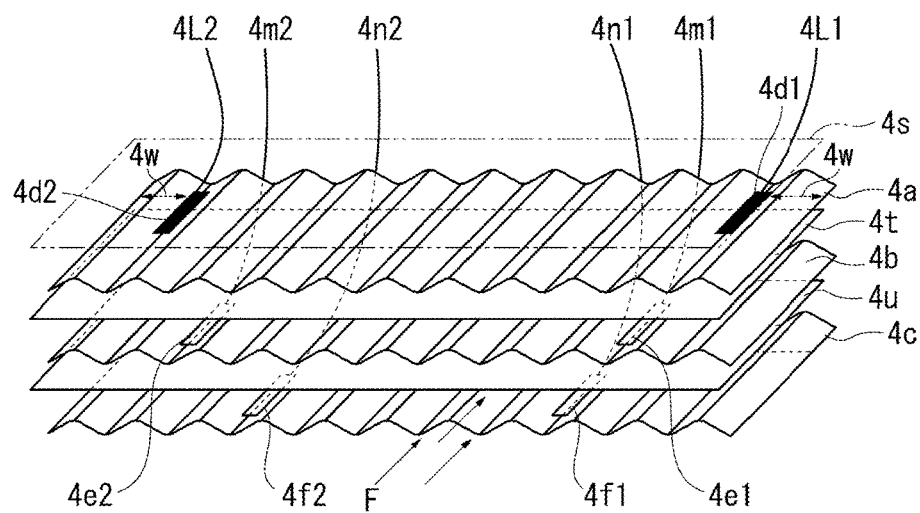
FIG. 3 is a perspective view showing the stacking structure of insulation sheets and metal thin plates of a heater section.
Figure 4:
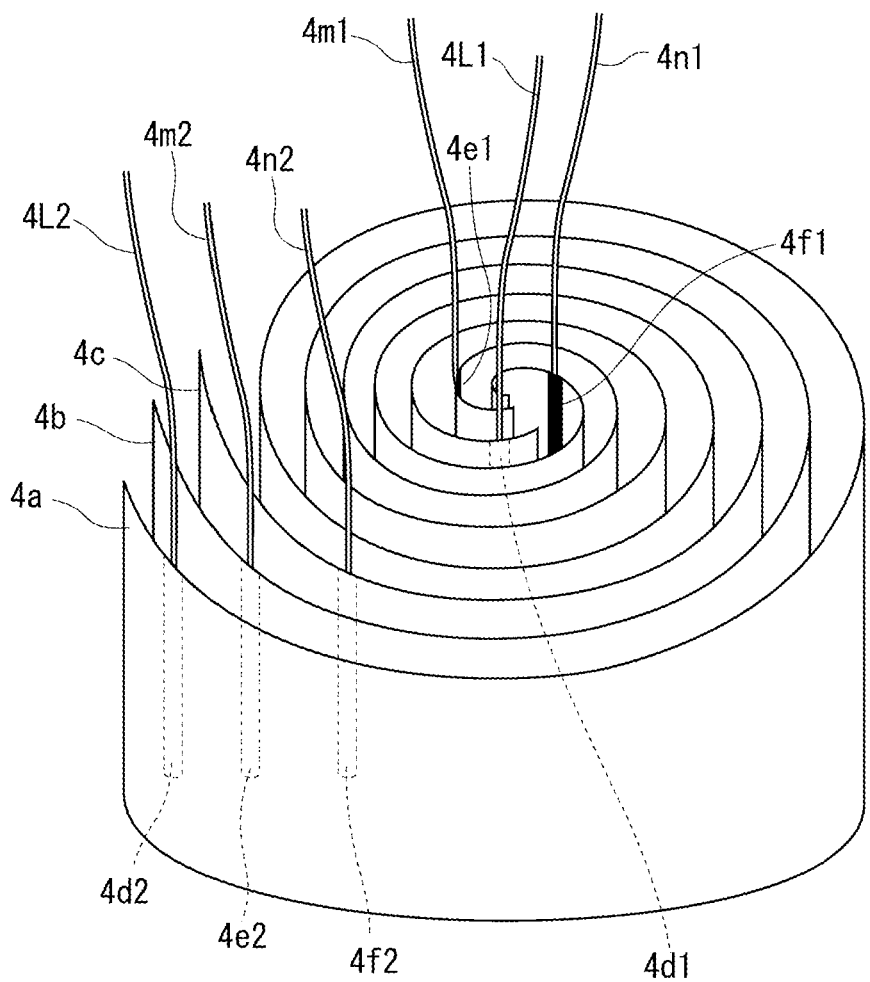
FIG. 4 is a perspective view showing the structure of the heater section.

As shown in FIGS. 3 and 4, the heater section 4 is configured such that a plurality (three in the present example) of metal thin plates 4a-4c and insulation sheets 4s-4u stacked alternatingly are wound concentrically and such that pairs consisting respectively of positive electrodes 4d1-4f1 and negative electrodes 4d2-4f2 for energizing the metal thin plates 4a-4c for generation of heat are joined to the respective metal thin plates 4a-4c in such a manner that the positive electrodes 4d1-4f1 are located away from the respective negative electrodes 4d2-4f2 in a winding direction.

Notably, a pair consisting of the positive electrode 4d1 and the negative electrode 4d2 is disposed on the metal thin plate 4a such that the positive electrode 4d1 and the negative electrode 4d2 are located away from each other in the winding direction, so as to apply electricity between the positive electrode 4d1 and the negative electrode 4d2 for generation of heat. Therefore, for example, in the case where the positive electrode 4d1 is divided into two or more positive electrodes 4d1, and branches of a lead wire 4L1 are connected to the respective positive electrodes 4d1 for supply of electricity, the positive electrodes 4d1 can be collectively considered as a single positive electrode 4d1 or a single positive electrode 4d1 (group). In this case, even in the event of detachment of one of the positive electrodes 4d1 from the metal thin plate 4a, the other positive electrodes 4d1 maintain energization. The same also applies to the negative electrode 4d2.

That is, the positive electrode 4d1 (group) and the negative electrode 4d2 (group) must be disposed such that the positive electrode 4d1 (group) is disposed on one side in the winding direction of the metal thin plate 4a, whereas the negative electrode 4d2 (group) is disposed on the other side and such that the one positive electrode 4d1 (group) is disposed away from the one negative electrode 4d2 (group) in the winding direction of the metal thin plate 4a. Therefore, an electrode arrangement in which three or more positive and negative electrodes 4d1 and 4d2 are alternatingly disposed in the winding direction of the metal thin plate 4a (e.g., an electrode arrangement in which the positive electrode 4d1, the negative electrode 4d2, and the positive electrode 4d1 are disposed from one end of the metal thin plate 4a) is eliminated, since smooth application of electricity between paired electrodes for generation of heat becomes difficult.

Needless to say, the same also applies to the other metal thin plates 4b to 4c.

Further, as shown in FIG. 2, the retainer 2 is a cylindrical ceramic porous member having a center opening 2c and a large number of holes 2h extending along a flow velocity direction (axial direction) F. Lead wires 4L1-4n2 of the heater section 4 extend outward from the center opening 2c of the retainer 2.

The heater section 4 is axially retained between the retainer 2 and the catalyst section 6, whereby these members are fixed within the casing 9.

The control unit 9 shuts off electricity supplied to the heater section 4 for saving electricity if energization is unnecessary (e.g., when exhaust gas is sufficiently warm). Also, the control unit 9 can perform such control as to use energy (electricity) regenerated by the motor 104 in the course of deceleration of the vehicle 100 as electricity for energizing the heater section 4.

Next, the detailed structure of the heater section 4 will be described with reference to FIGS. 3 to 5.

As shown in FIG. 3, an insulation sheet 4s, a metal thin plate 4a, an insulation sheet 4t, a metal thin plate 4b, an insulation sheet 4u, and a metal thin plate 4c of the heater section 4 are stacked sequentially in the descending direction; thus, after the resultant material stack is wound as shown in FIG. 4, the metal thin plates 4a-4c do not come into contact with each other.

The positive electrode 4d1 and the negative electrode 4d2 for the metal thin plate 4a are joined to the metal thin plate 4a at positions located inward of opposite ends thereof with respect to the winding direction of the metal thin plate 4a; as a result, margins 4w are formed respectively between the opposite ends of the metal thin plate 4a and the positive and negative electrodes 4d1 and 4d2. The same also applies to the positive electrode 4e1 and the negative electrode 4e2 for the metal thin plate 4b and to the positive electrode 4f1 and the negative electrode 4f2 for the metal thin plate 4c.

Notably, the expression "located inward of opposite ends with respect to the winding direction" excludes the case where the positive and negative electrodes 4d1 and 4d2 are located at the opposite ends with respect to the winding direction. However, if the positive electrode 4d1 and the negative electrode 4d2 are located excessively toward the center with respect to the winding direction, an effective area of the metal thin plate 4a for generation of heat through energization reduces. Therefore, the positions of joints of the positive and negative electrodes may be adjusted so as to secure a required amount of heat generated.

Further, the positive electrode 4d1 and the negative electrode 4d2 are connected to the lead wires 4L1 and 4L2, respectively; the positive electrode 4e1 and the negative electrode 4e2 are connected to the lead wires 4m1 and 4m2, respectively; and the positive electrode 4f1 and the negative electrode 4f2 are connected to the lead wires 4n1 and 4n2, respectively.

Through application of electricity to the lead wires 4L1-4n2, the metal thin plates 4a-4c generate heat. Accordingly, the heater section 4 heats the exhaust gas; thus, the exhaust gas at low temperature is heated quickly to thereby accelerate catalytic reaction in the downstream catalyst section 6.

As shown in FIG. 4, the material stack of FIG. 3 is concentrically wound so as to form the heater section 4. Also, as shown in FIG. 5, in the present embodiment, the positive electrodes 4d1-4f1 are disposed only at a central portion of the heater section 4, whereas the negative electrodes 4d2-4f2 are disposed only at an outer circumferential portion of the heater section 4. Further, the positive electrodes 4d1-4f1 are disposed at different positions along a circumferential direction of the heater section 4, and the negative electrodes 4d2-4f2 are disposed at different positions along the circumferential direction of the heater section 4.

Notably, the expression "the positive electrodes 4d1-4f1 are disposed at different positions along a circumferential direction of the heater section 4" means that broken lines extending from a center P of the heater section 4 to the positive electrodes 4d1-4f1 do not coincide with each other. The center P indicates center-side end portions of the metal thin plates 4a-4c of the heater section 4 and does not necessarily coincide with the center of a circle corresponding to a circular cross section of the heater section 4. In the case where the center-side end portions of the metal thin plates 4a-4c are offset from each other, the center P indicates the end portion located closest to the center.

Figure 5:
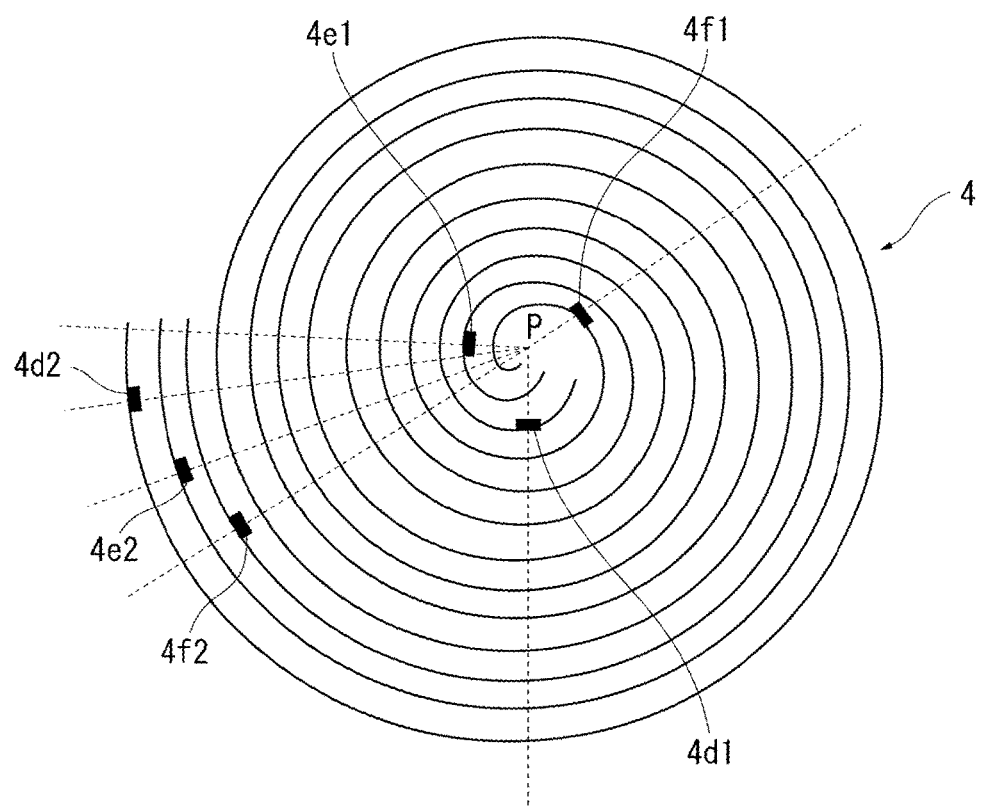
FIG. 5 is a plan view showing the structure of the heater section.

In FIGS. 4 and 5, for easy visibility, illustration of the insulation sheets 4s-4u is eliminated.

The metal thin plates 4a-4c can be formed of, for example, Fe—Cr—Al alloy, and the insulation sheets 4s-4u can be formed of, for example, fabric woven from alumina wire. The metal thin plates 4a-4c are corrugated along the winding direction such that as a result of winding, a large number of gaps extending along the direction of flow velocity (axial direction) F are formed, thereby securing passage of gas.

The positive electrodes 4d1-4f1, the negative electrodes 4d2-4f2, and the lead wires can be formed of, for example, Ni.

As mentioned above, in the catalyst apparatus 10 for an internal combustion engine of the present embodiment, the heater section 4 has a plurality of conductors (metal thin plates 4a-4c) to be individually energized. Thus, even when a certain conductor fails to be energized as a result of breaking of a weld of any one of the electrodes 4d1-4f2 joined to a relevant one of the metal thin plates 4a-4c, breaking of the relevant one of the metal foils 4a-4c, or breaking of a relevant one of the lead wires 4L1-4n2, the other conductors (metal thin plates 4a-4c) are normally energized to thereby generate heat. Therefore, a failure to energize the entire heater section 4 is prevented, whereby the heater section 4 can reliably generate heat.

Also, since a plurality of conductors (metal thin plates 4a-4c) are stacked and wound, the axial length of the heater section 4 does not increase; thus, the heater section 4 becomes compact.

Further, when the difference in area between portions of the conductors (metal thin plates 4a-4c) located between the positive electrodes and the negative electrodes is set to fall within a range of ±10%, the metal thin plates 4a-4c have substantially the same heat generation capability with a tolerance of ±10%; accordingly, even in the event of a failure to energize any one of the metal thin plates, since the other metal thin plates exhibit substantially the same heat generation capability as that of the metal thin plate in a compensating manner, the heater section 4 can maintain its heat generation capability.

Also, in the present embodiment, as shown in FIG. 3, the positive electrodes and the negative electrodes are joined to the respective metal thin plates at positions located inward of opposite ends with respect to the winding direction of the metal thin plates; as a result, the margins 4w are formed respectively between the opposite ends of the metal thin plate 4a and the positive and negative electrodes 4d1 and 4d2 (the same also applies to the other metal thin plates 4b and 4c).

Since the margins 4w are not energized and thus do not generate heat, to thereby function as heat sinks for cooling the positive electrodes 4d1 and the negative electrodes 4d2, deterioration in strength of joints between the metal thin plates and the positive and negative electrodes can be restrained, so that a failure to energize the heater section 4 as a result of breaking of the joints can be restrained.

Also, in the present embodiment, as shown in FIG. 5, the positive electrodes are disposed at respectively different positions along the circumferential direction of the heater section 4, and the negative electrodes are disposed at respectively different positions along the circumferential direction of the heater section 4.

As a result, there can be restrained overheating of a certain region which could otherwise result from concentration of the positive electrodes or the negative electrodes in the region; accordingly, deterioration in strength of joints between the metal thin plates and the positive and negative electrodes can be restrained, so that a failure to energize the heater section 4 as a result of breaking of the joints can be restrained.

Notably, a group of the positive electrodes and a group of the negative electrodes are disposed separately on the center side and the outer-circumference side, respectively, of the heater section 4. Accordingly, even though the positive electrodes and the negative electrodes positionally coincide with each other in the circumferential direction of the heater section 4, the positive and negative electrodes are not concentrated in a single region; therefore, the positive electrodes and the negative electrodes may be disposed at circumferentially same positions of the heater section 4, and all of the positive electrodes and the negative electrodes are not necessarily disposed at respectively different positions.

In the case of the heater section 4 having a small diameter, even though a group of the positive electrodes and a group of the negative electrodes are disposed separately at an outer circumferential portion and at a central portion of the heater section 4, the positive electrodes and the negative electrodes may possibly be disposed close to one another.

In such a case, disposition of all of the positive electrodes and the negative electrodes at respectively different positions in the circumferential direction of the heater section 4 is effective.

The present invention is not limited to the above embodiment, but extends into various modifications and equivalents encompassed by the ideas and scope of the invention. For example, no particular limitation is imposed on the structures and shapes of the heater section, the positive electrodes, the negative electrodes, and the catalyst section.

The present embodiment uses the insulation sheets for insulating the metal thin plates. However, the insulator is not limited to the insulation sheets. Insulation coating may be applied over the metal thin plates, or the metal thin plates may be separated from one another through disposition of ceramic insulators between the metal thin plates.

The above-mentioned vehicle is not limited to a hybrid vehicle, but may be a diesel vehicle driven by a diesel engine, or other types of vehicles.

The retainer 2 of the catalyst apparatus 10 is not a mandatory element, but may be eliminated if the heater section 4 can be fixed by another element. The heater section 4 and the catalyst section 6 of the catalyst apparatus 10 may not be in contact with each other.

The positive electrodes may switch positions with the negative electrodes such that the positive electrodes are disposed on the outer-circumference side of the heater section 4, whereas the negative electrodes are disposed on the center side of the heater section 4.

In the present embodiment, a stack of the metal thin plates and the insulation sheets is wound concentrically. However, the winding form is not limited thereto; i.e., winding may not be in a concentric form. Also, no particular limitation is imposed on the number of windings.

DESCRIPTION OF REFERENCE NUMERALS

4: heater section
4a-4c: metal thin plate
4s-4u: insulator
4d1-4f1: positive electrode
4d2-4f2: negative electrode
6: catalyst section
10: catalyst apparatus for internal combustion engine
100: internal combustion engine
108: exhaust passage

The invention claimed is:
1. A catalyst apparatus for an internal combustion engine which is disposed in an exhaust passage for exhaust gas discharged from an internal combustion engine, comprising:
   a catalyst section in which the exhaust gas is purified; and
   a heater section in which the exhaust gas is heated, said heater section being disposed upstream of the catalyst section in the exhaust passage, wherein
   the heater section contains a plurality of metal thin plates and insulators that are stacked alternatingly and are wound,
   the heater section contains a pair comprising a positive electrode and a negative electrode for energizing and heating the metal thin plates, and
   the positive electrode and the negative electrode are joined to each of the metal thin plates in such a manner that the positive electrode is located away from the negative electrode in a winding direction of the metal thin plates.

2. The catalyst apparatus for the internal combustion engine according to claim 1, wherein the positive electrode and the negative electrode are joined to each of the metal thin plates at a position located inward of opposite ends thereof with respect to the winding direction of the metal thin plates.

3. The catalyst apparatus for the internal combustion engine according to claim 2, wherein
   the heater section contains a plurality of the pairs,
   either of a group of the positive electrodes and a group of the negative electrodes is disposed only at an outer circumferential portion of the heater section, whereas the other group is disposed only at a central portion of the heater section,
   the positive electrodes are disposed at respectively different positions along a circumferential direction of the heater section, and
   the negative electrodes are disposed at respectively different positions along the circumferential direction of the heater section.

4. The catalyst apparatus for the internal combustion engine according to claim 2, wherein all of the positive electrodes and the negative electrodes are disposed at respectively different positions along a circumferential direction of the heater section.

5. The catalyst apparatus for the internal combustion engine according to claim 2, wherein areas of portions of the metal thin plates, each of which portions is located between the positive electrode and the negative electrode, may vary from each other within a range of ±10%.

6. The catalyst apparatus for the internal combustion engine according to claim 1, wherein
the heater section contains a plurality of the pairs,
either of a group of the positive electrodes and a group of the negative electrodes is disposed only at an outer circumferential portion of the heater section, whereas the other group is disposed only at a central portion of the heater section,
the positive electrodes are disposed at respectively different positions along a circumferential direction of the heater section, and
the negative electrodes are disposed at respectively different positions along the circumferential direction of the heater section.

7. The catalyst apparatus for the internal combustion engine according to claim 6, wherein areas of portions of the metal thin plates, each of which portions is located between the positive electrode and the negative electrode, may vary from each other within a range of ±10%.

8. The catalyst apparatus for the internal combustion engine according to claim 1, wherein all of the positive electrodes and the negative electrodes are disposed at respectively different positions along a circumferential direction of the heater section.

9. The catalyst apparatus for the internal combustion engine according to claim 1, wherein areas of portions of the metal thin plates, each of which portions is located between the positive electrode and the negative electrode, may vary from each other within a range of ±10%.

* * * * *